United States Patent [19]
Collard

[11] Patent Number: 5,883,332
[45] Date of Patent: *Mar. 16, 1999

[54] METHOD AND APPARATUS FOR JUNCTION BOX AND CONDUIT SUPPORT

[76] Inventor: Bobby Collard, 405 Brookview Dr., Garlant, Tex. 75043

[*] Notice: The term of this patent shall not extend beyond the expiration date of Pat. No. 5,698,820.

[21] Appl. No.: 914,547

[22] Filed: Aug. 19, 1997

Related U.S. Application Data

[63] Continuation-in-part of Ser. No. 495,043, Jun. 27, 1995, Pat. No. 5,698,820.

[51] Int. Cl.$^6$ ............................................. H02G 3/18
[52] U.S. Cl. ........................... 174/57; 174/65 R; 220/3.7
[58] Field of Search .................................. 174/17 R, 48, 174/50, 58, 63, 65 R, 57; 220/3.3, 3.7, 4.02; 248/906

[56] References Cited

U.S. PATENT DOCUMENTS

| | | | |
|---|---|---|---|
| 2,528,238 | 10/1950 | McDaid | 108/149 |
| 2,670,919 | 3/1954 | Esoldi | 248/27.1 |
| 2,788,188 | 4/1957 | Smith et al. | 248/57 |
| 5,698,820 | 12/1997 | Collard | 174/57 |

Primary Examiner—Kristine Kincaid
Assistant Examiner—Dhiru R Patel
Attorney, Agent, or Firm—J. F. Bryan

[57] ABSTRACT

A flat plate is provided to which an electrical junction box is centrally mounted with the plate extending circumferentially beyond the sides of the junction box. Conduits entering the junction box are supported by conduit clamps attached to the extended portions of the plate by clamping proximate the periphery thereof so as to permit alignment of the conduit clamps with the entering conduit.

11 Claims, 7 Drawing Sheets

METHOD AND APPARATUS FOR JUNCTION BOX AND CONDUIT SUPPORT

This application is a continuation in part of previous application Ser. No. 08/495,043, filed Jun. 27, 1995 Now U.S. Pat. No. 5,698,820.

FIELD OF THE INVENTION

The present invention relates to electrical junction box and conduit installation for wiring and particularly to the provision of support for conduit entering a junction box as installed in a building structure.

BACKGROUND AND SUMMARY OF THE INVENTION

The installation of electrical wiring in building construction is subject to stringently enforced codes in order to assure safe, trouble free operation. Wiring must be run in protective conduit with all of the connections made in junction boxes that provide both protection and access. Both the conduit and the boxes must be mounted to structural supports and constrained in accordance with the Electrical Code. In the typical commercial building, air ducts and wiring are installed overhead and subsequently concealed by a suspended ceiling. The junction boxes and conduit are placed at an elevation which allows room for ceiling segments to be lifted up and removed from their hanging framework to provide access for future maintenance. The electrical installation is supported in much the same manner as the suspended ceiling, by hangers anchored in the steel or concrete of the floor above. The National Electrical Code requires conduit to be supported within 36" of each entry to a junction box (18" for flexible conduit).

Others have disclosed wiring support arrangements which attach to the suspended ceiling frame. Such support however, requires that the electrical installation be made after the ceiling framework is in place, which is awkward and time consuming. The accepted method of support in the industry is to mount the junction box in place with one hanger and set a separate hanger within 36" for each conduit entering the box. An alternative method to setting separate hangers for each conduit is to bolt outwardly extending brackets on the box, above the entry holes, for clamp attachments. The brackets are made from cut lengths of formed "C" section structural members, with the open side facing down to receive clip washers for making a bolted connection to the back of the box. The conduit is supported by a clamp which is attached to the conduit and bolted to the underside of each bracket with another clip washer and bolt. The latter method eliminates a number of anchors and hangers and, inasmuch as the installer can pre-assemble the brackets to the box at floor level in a relatively short time, the overall cost of installation is reduced. Even so, there is a significant amount of time involved in assembly of the component parts, as well as the cost of the material.

The object of the present invention is to provide a simplified method and apparatus for supporting junction boxes and entering conduit so as to reduce labor and material costs for installation. A second object is to provide such method and apparatus for installation independent of suspended ceiling structure and in accordance with the specifications of the National Electrical Code.

The present invention accomplishes the above objects with a mounting bracket to which the back of any standard junction box can be bolted so as to provide conduit clamp attachments for all entry configurations without any need for field modification.

DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE INVENTION

Figure 1:
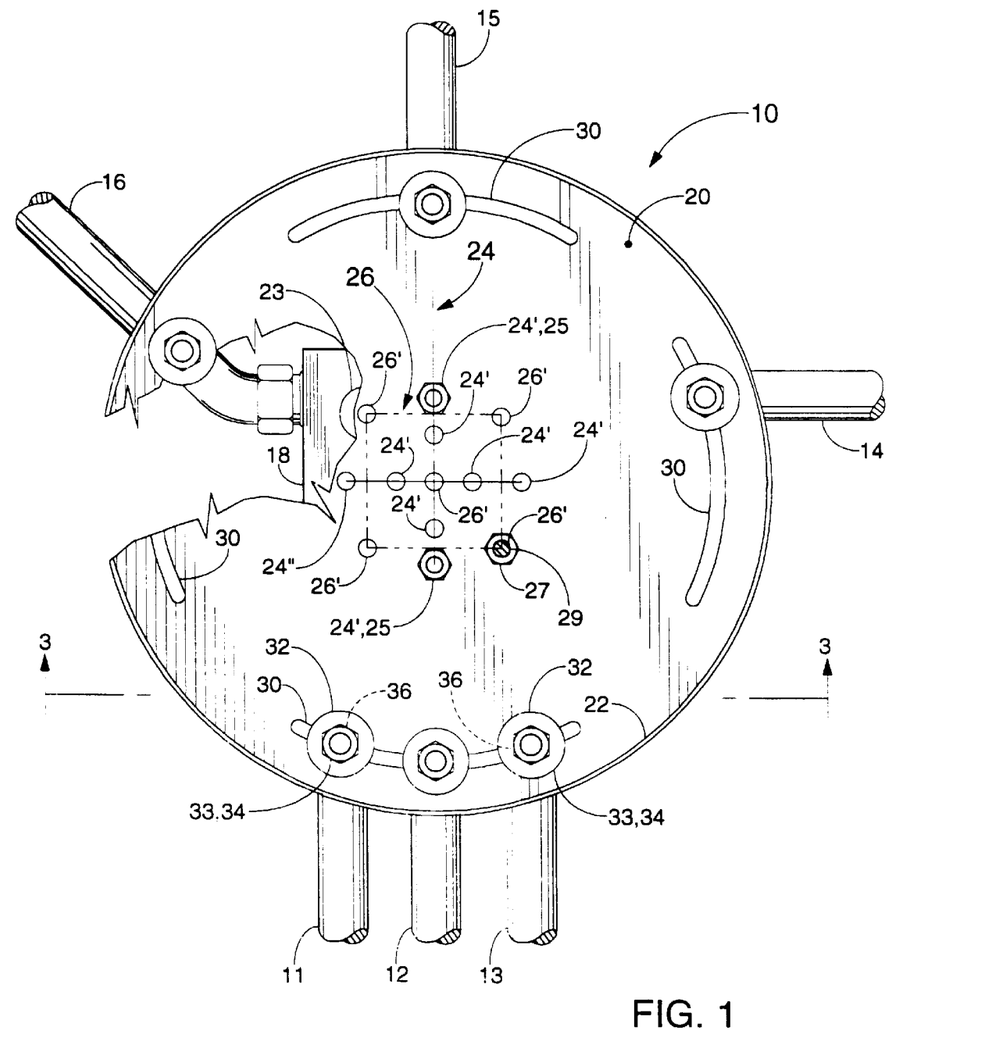
FIG. 1 shows a view from above of a preferred embodiment of the present invention as used in an electrical installation.
Figure 2:
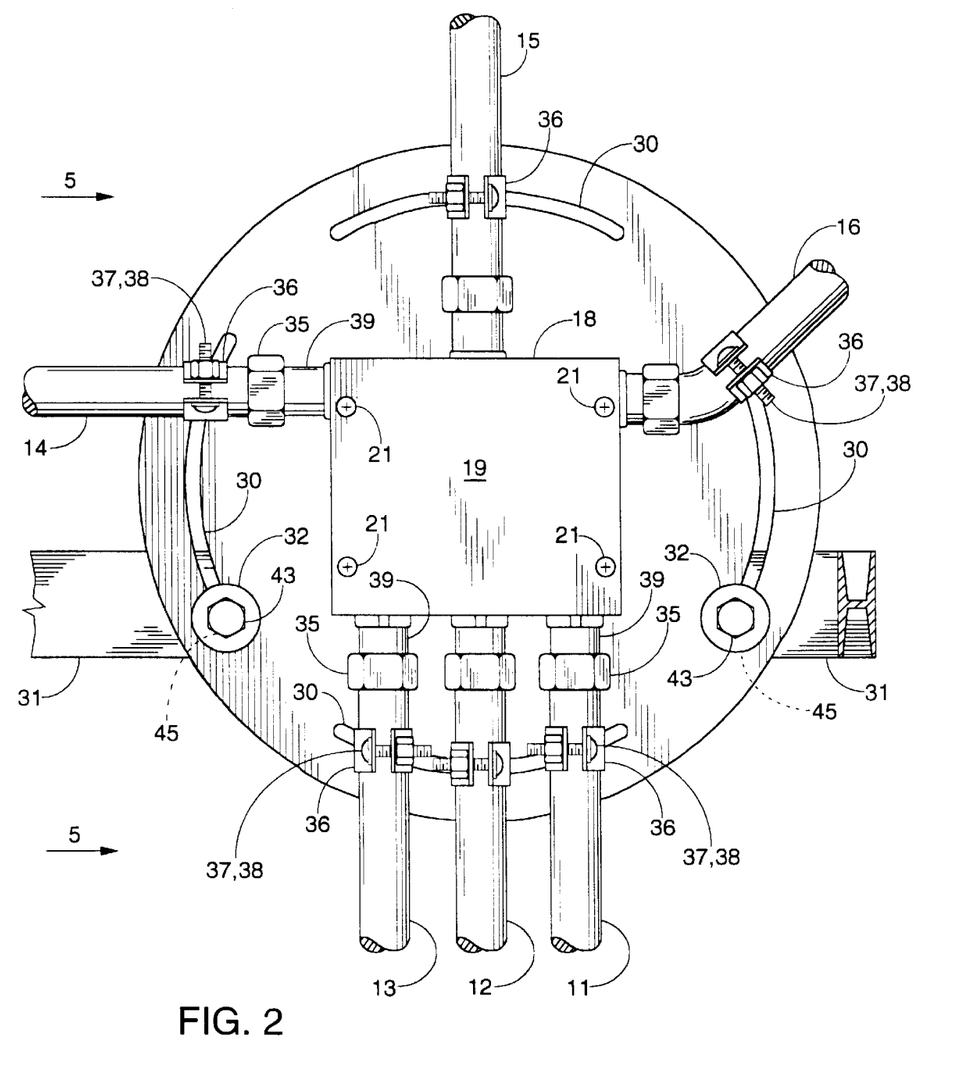
FIG. 2 shows a view from below of the embodiment of FIG. 1 in the same electrical installation.
Figure 3:
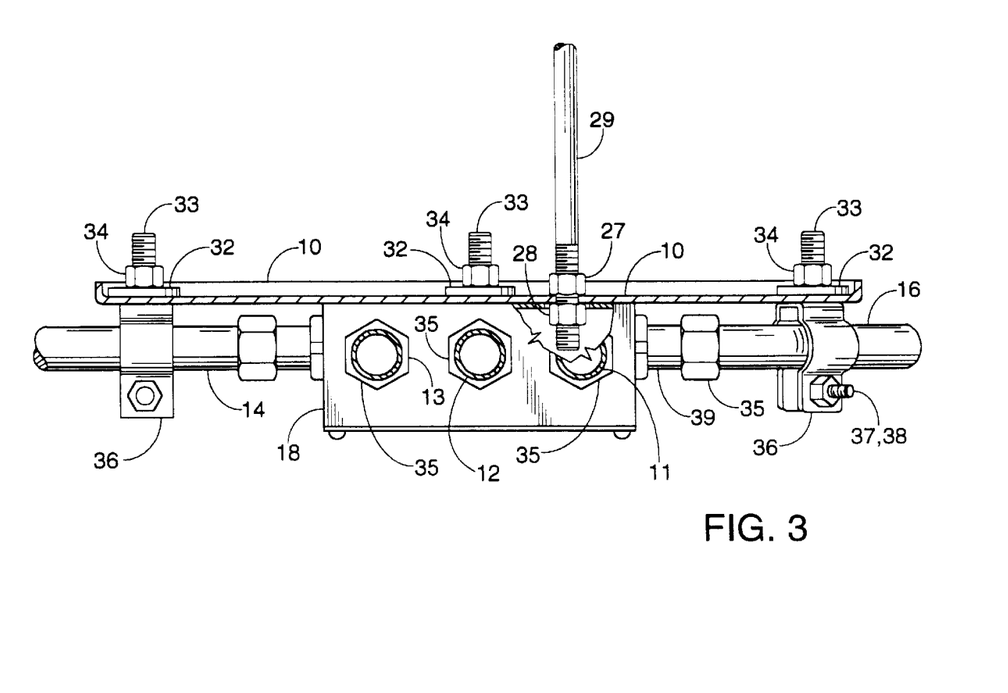
FIG. 3 shows a partial section view of the preferred embodiment taken along the line 3—3 of FIG. 1.

FIGS. 1, 2 & 3 are views of a preferred embodiment of junction box and conduit support bracket 10 of the present invention as used to mount electrical junction box 18 and support conduits 11–16 for entry. While junction box 18 is square in shape, it is to be understood that the present invention is applicable to octagonal junction boxes or those of any other available shape and that the following description is substantially the same regardless of junction box shape. FIG. 1 is a view of this installation from above. Support bracket 10 comprises a circular flat plate 20, which may be made of 22 gauge (0.0299" thick) galvanized sheet steel with flanged edge 22 for stiffness, or of thicker material without such stiffening means. Junction box 18 is assembled to the central portion of support bracket 10 by nut and bolt fasteners 25, which are fitted to two bolt holes 24' in the cruciform eight hole pattern 24. While a single fastener 25 can adequately mount junction box 18 on support bracket 10, second fastener 25 does not allow relative rotation during conduit assembly. Six holes 24' of bolt hole pattern 24 conform to dimensions of a hole pattern provided in junction box backs for mounting purposes, in accordance with industry standard practice, and two holes 24" are added for symmetry. Five additional holes 26' arranged in a 2" square pattern 26, with one in the center, are also provided in support bracket 10. In addition to the industry standard mounting holes, the flat back of junction box 18 also includes several knock-out entry ports 23, usually five, arranged in an approximately 2" square pattern, with one in the center. Hanger 29 is anchored at its unshown upper end and upper nut 27 is threaded on its lower end. The lower end of hanger 29 is passed through a convenient mounting hole in either pattern 24 or 26 of support bracket 10 after removing a knock-out 23 for access if using one of the holes 26'. Upper nut 27 and lower nut 28 (shown in FIG. 3) mount support bracket 10 and junction box 18 at an elevation for entry of conduits 11–16. Flat plate 20 extends outwardly and the extended portion is pierced by arcuate slots 30, orthogonally arranged with respect to hole pattern 24 so as to be juxtaposed to the four sides of junction box 18. Fender washers 32, machine screws 33, nuts 34 and conduit clamps 36 connect conduits 11–16 to support bracket 10 as is shown in FIGS. 2 and 3.

FIG. 2 shows an installation identical to that of FIG. 1 as seen from below, differing only in that the assembly is mounted to beam 31 by beam clamps 45, mounting bolts 43 and fender washers 32 rather than being suspended from an overhead structure by hanger 29. Here, junction box 18 is seen to have its cover plate 19 attached by fasteners 21 and the support of conduits 11–16 is more fully shown. Conduits 11–16 are seen to be installed for entry into junction box 18 by conduit entry fittings 39 and locked in place by tube nuts 35. Machine screws 33 are here seen to pass through arcuate slots 30 for mounting conduit clamps 36 to the underside of support bracket 10. Conduit clamps 36 are commercially available hardware items which are clamped to conduits 11–16 by machine screws 37 and nuts 38. A functional attribute of arcuate slot 30 is the offset displacement of machine screws 37, as shown for adjacent conduits 12 and 13, so as to obviate interference with each other in adjacent clamps 36.

FIG. 3 shows a side view and partial section view of the installation of FIGS. 1 & 2 as taken along the line 3—3 of FIG. 1, with an auxiliary, broken-out section detail of the mounting of support bracket 10. Here, upper nut 27 and lower nut 28 are seen to be tightened on hanger 29, so as to hold support bracket securely in place, and the removal of knock-out 23 for access to a hole 26' is also indicated.

The connection of clamps 36 by means of fender washers 32, machine screws 33 and nuts 34 to conduit support 10 and the clamping of conduit clamps 36 to conduits 14 and 16 by means of machine screws 37 and nuts 38 is more clearly shown in this view. Junction box 18 may be used in conjunction with ½", ¾" or 1" conduit sizes and there is a modest variation in the height of the clamping axis among these sizes. This variation may accommodated by slight flexure of support bracket 10 or by inserting additional washers 32 between support bracket 10 and either clamps 36 or junction box 18 as required. The relatively thin material of the preferred embodiment permits support bracket 10 to flex slightly so as to obviate the need for additional washers 32.

Figure 4:
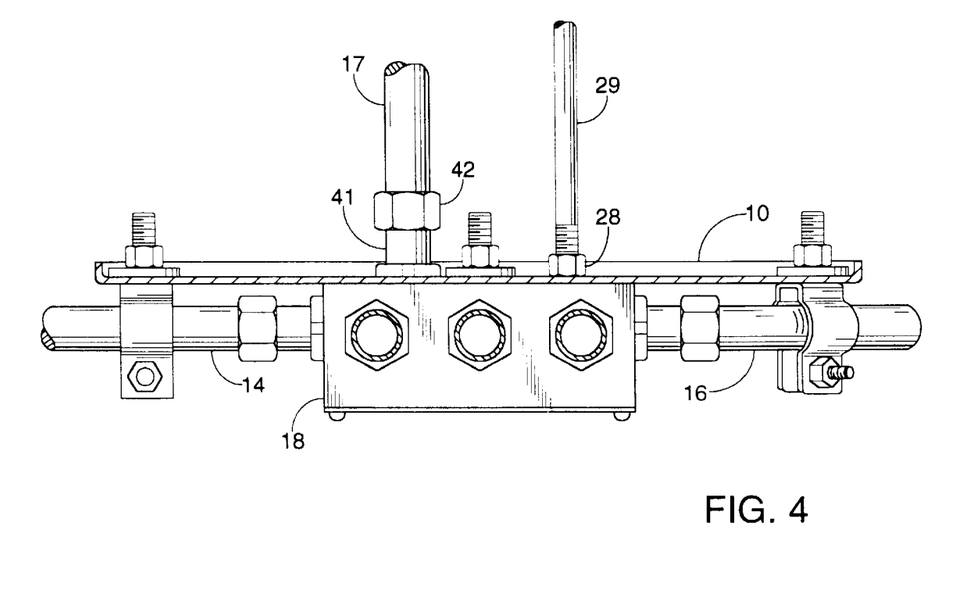
FIG. 4 shows the preferred embodiment of the present invention as used in a second electrical installation.

The electrical installation shown in FIG. 4 is essentially the same as that of FIGS. 1 and 3, except that a knock-out entry 23 has been opened in junction box 18 and a matching hole has been cut in conduit support 10 for installation of conduit 17, conduit entry fitting 41 and tube nut 42. Thus, support permits entry from above if such is required, and in fact, greatly simplifies access for such entry as compared to the previously discussed use of formed "C" sections bolted to the back of junction box 18.

Figure 5:
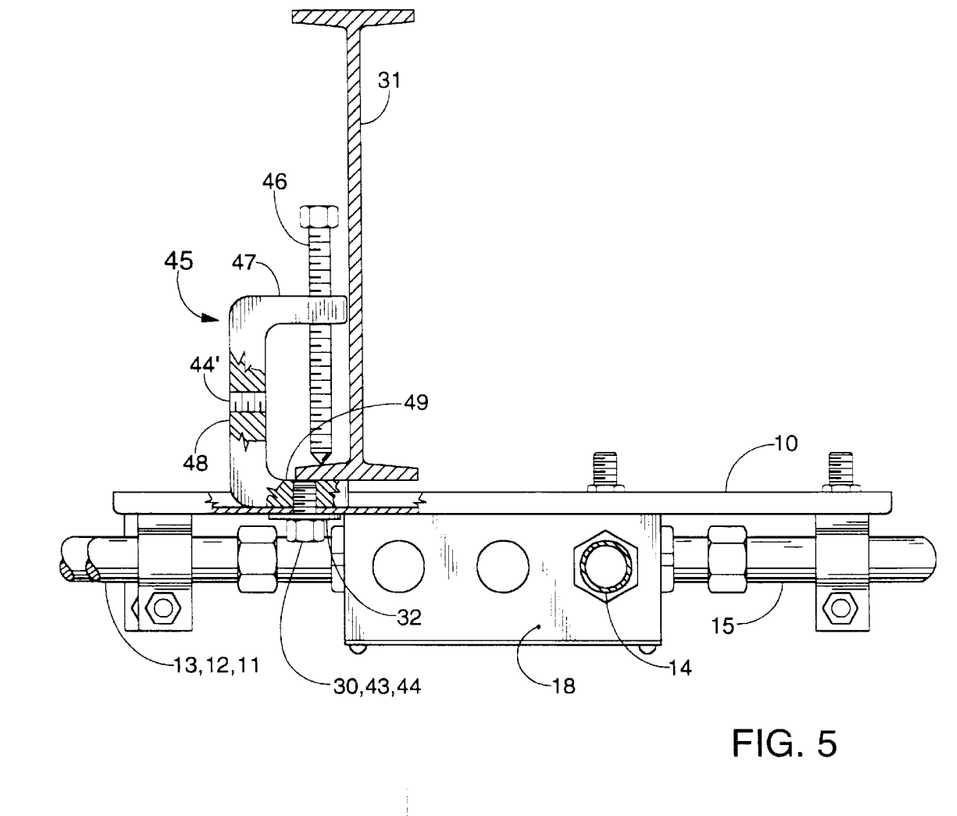
FIG. 5 shows the present invention as used to mount an electrical installation directly to a structural member.

FIG. 5 is an end view of the beam 31 of FIG. 2, as seen from the direction of arrows 5—5, showing the manner in which beam clamps 45 are attached. Beam clamps 45, which are commercially available items, comprise base, arm and jaw portions 47, 48 and 49 respectively, and have threaded holes 44 and 44' tapped in jaw portion 49 and arm portion 48 respectively. Support bracket 10 is secured to beam clamps 45, at selected slots 30, by mounting bolts 43 and fender washers 32. Beam clamps 45 are then positioned on beam 31 as shown, and tightened in place by clamping screws 46. If loading conditions permit, particularly as regards the size and number of entering conduits, a single beam clamp 45 and mounting bolt 43 may be used for a cantilevered mounting of support bracket 10. The provision of two threaded holes 44 and 44', at 90° to each other, allows great flexibility in the manner in which beam clamp 45 may be applied to different structural members for purposes of mounting support bracket 10 thereto.

Figure 6:
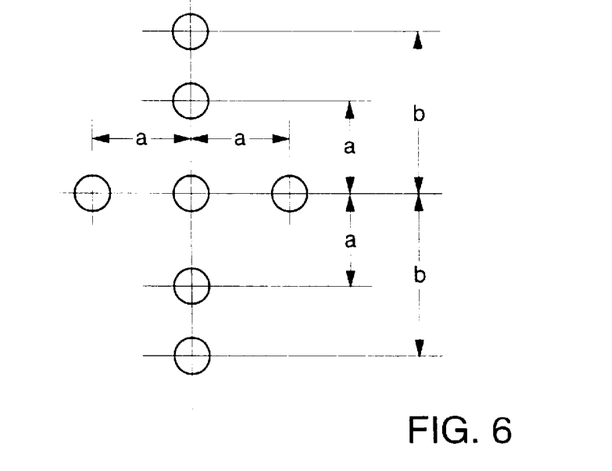
FIG. 6 shows an industry standard bolt hole pattern for junction boxes.

FIG. 6 shows the industry standard bolt hole pattern, which is centered in junction box backs for mounting purposes. In this standard practice hole pattern, dimension "a" is approximately 0.75" and dimension "b" is approximately 1.28".

Figure 7:
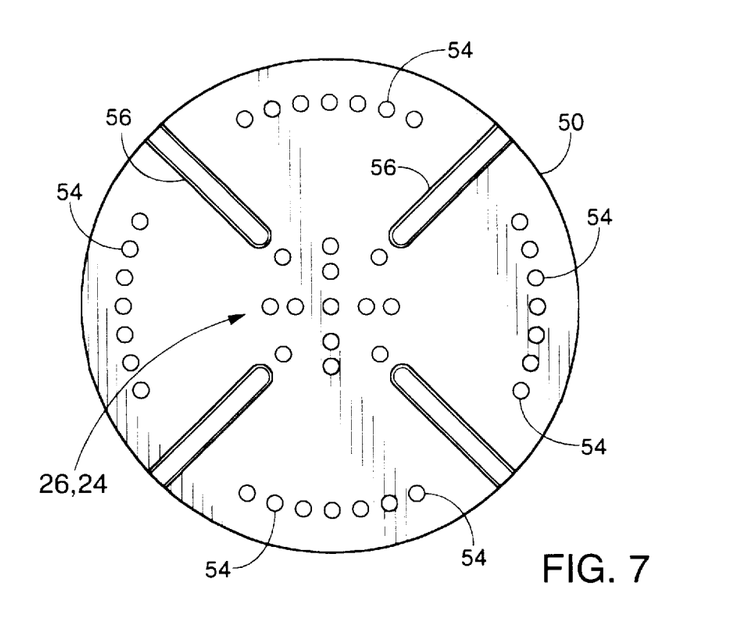
FIG. 7 shows an alternative embodiment of the present invention.
Figure 8:
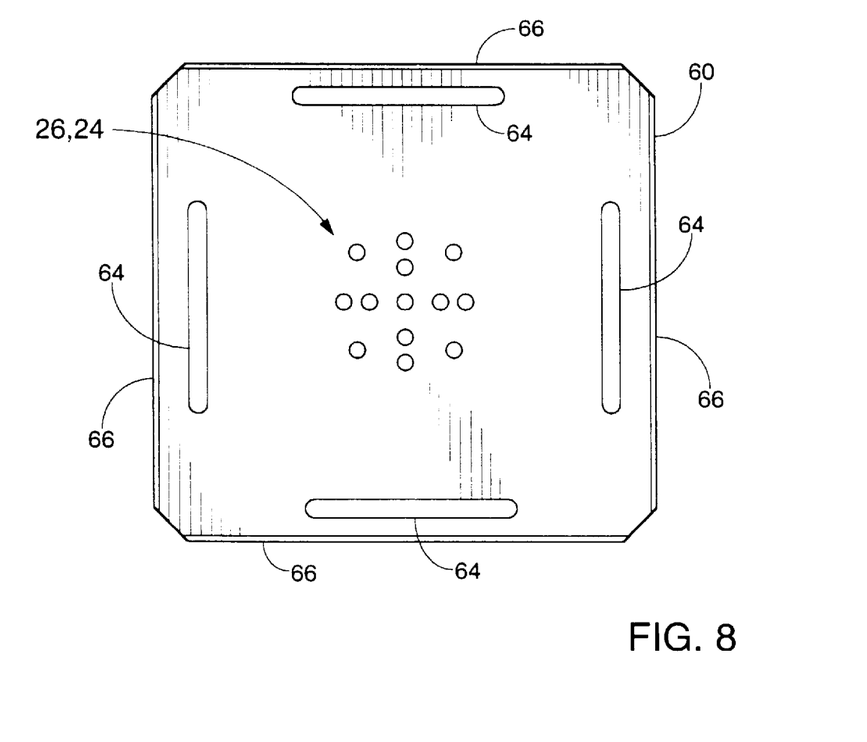
FIG. 8 shows a second alternative embodiment of the present invention.

FIGS. 7 and 8 show alternative embodiments of the present invention, support brackets 50 and 60 respectively. In FIG. 7, attachment for conduit clamps 36 to circular support bracket 50 is provided by a plurality of holes 54 arranged along an arcuate path so as to permit alignment with any chosen entry port. As in FIG. 1, hole patterns 24 and 26 are provided for assembly and mounting purposes. The stiffness required for conduit support is provided either by using material heavier than 22 ga. or by formed stiffening beads 56. In FIG. 8, support bracket 60 is made in a square cut shape with straight slots 64 for attaching conduit clamps 36. Stiffness for supporting conduits is provided by bent flanges 66 or by use of heavier material. It will be noted that in either case, a greater amount of material is required for an equivalent unit as compared to preferred support bracket 10 or alternative 50 and that clearance of bolts 37, as provided for adjacent clamps by an arcuate clamp arrangement, is also lost.

Figure 9:
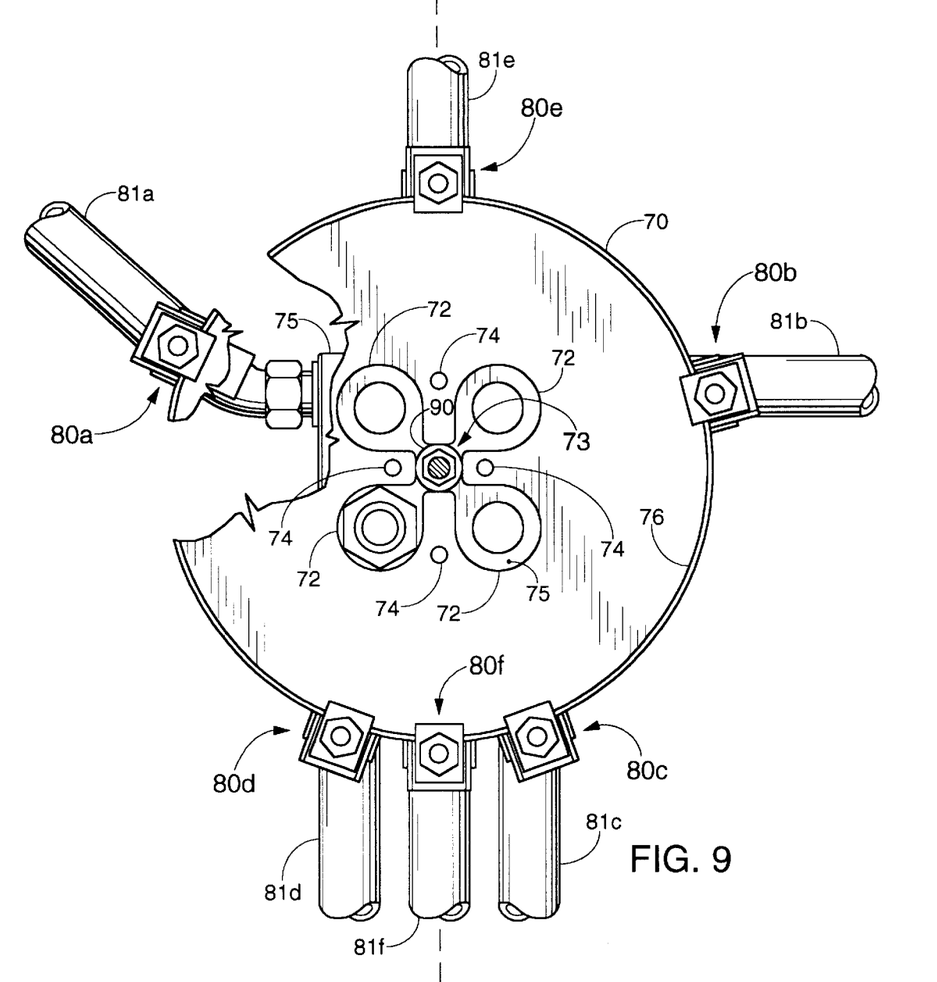
FIG. 9 shows a third alternative embodiment of the present invention in a functional assembly.
Figure 10:
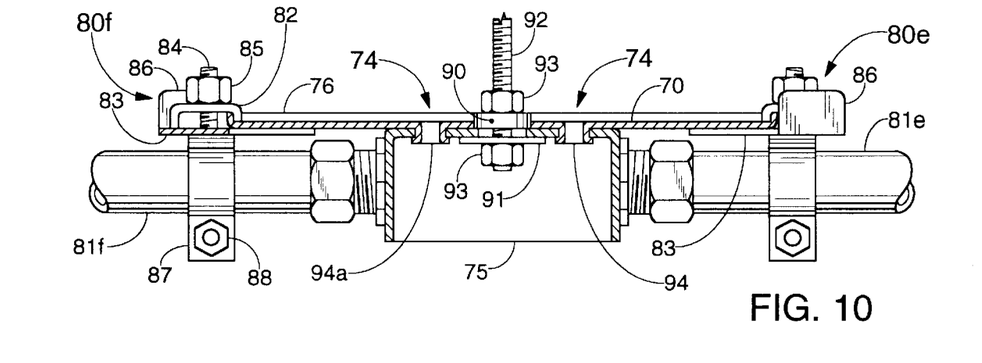
FIG. 10 shows a cross-section view of the assembly of FIG. 9.

FIGS. 9 and 10 show conduit support bracket 70, a third alternative embodiment of the present invention. Junction box 75, attached to the under face of bracket 70, can be seen where bracket 70 is broken away for that purpose. Note that bracket 70 includes four cut-outs 72, which adjoin open center 73 and spacer 90. The four connecting holes 74 will be described in detail in the discussion of FIG. 10. In addition to this central portion, bracket 70 is also shown to include a circumferential portion, extending outwardly 'to peripheral flange 76. Flange 76 at the circumferential outer edge of support bracket 70", serves both as a flat plate stiffener and as an aid to attachment of conduit clamp assemblies 80a–f, which provides support for conduits 81a–f at any point around its 360° periphery.

FIG. 10 is a cross-section of the above embodiment, viewed as indicated by the section view arrows X—X in FIG. 9. Here, connecting holes 74 are seen to be formed by drawing out extended tubular side-walls 94, and the location of connecting holes 74 is predetermined to match the hole pattern in the top of junction box 75. Assembly of bracket 70 to junction box 75 is accomplished by fitting the two parts together per FIG. 10, and flattening side-wall 94 as is shown in finished connection 94A. Spacer 90 is significantly thicker than the relatively thin material of bracket 70 and is of a diameter to fit within central opening 73 so as to eliminate excessive clearance. Hanger bolt 92 passes through spacer 90 and the knock-out hole in the top wall of junction box 75, where it is held in place by fender washer 91 and upper and lower nuts 93. The top wall of junction box 75 is gripped between spacer 90 and fender washer 91 as nots 93 are tightened. An added washer 91 could be placed above spacer 90, as a safety measure for installations in earthquake prone areas. Conduit clamp assemblies 80 are essentially the type of clamp shown in previous FIGS. 2 & 3 as conduit clamp 36, with the addition of channel section keeper 82 and clip 83 to the conventional assembly of clamping member 87, clamping nut & bolt assembly 88, mounting bolt 84 and nut 85. Mounting bolt 84 is passed through clip 83, which is then placed under the edge of bracket 70, while keeper 82 is placed over bolt 84 and bracket 70. One of the channel section legs of keeper 82 engages peripheral flange 76, where it is held in place by turned-up side 86 of clip 83 as nut 85 is tightened to complete the assembly. When nut 85 is fully tightened, the edge of bracket 70 is gripped tightly between clip 83 and keeper 82, with peripheral flange 76 preventing displacement.

Figure 11:
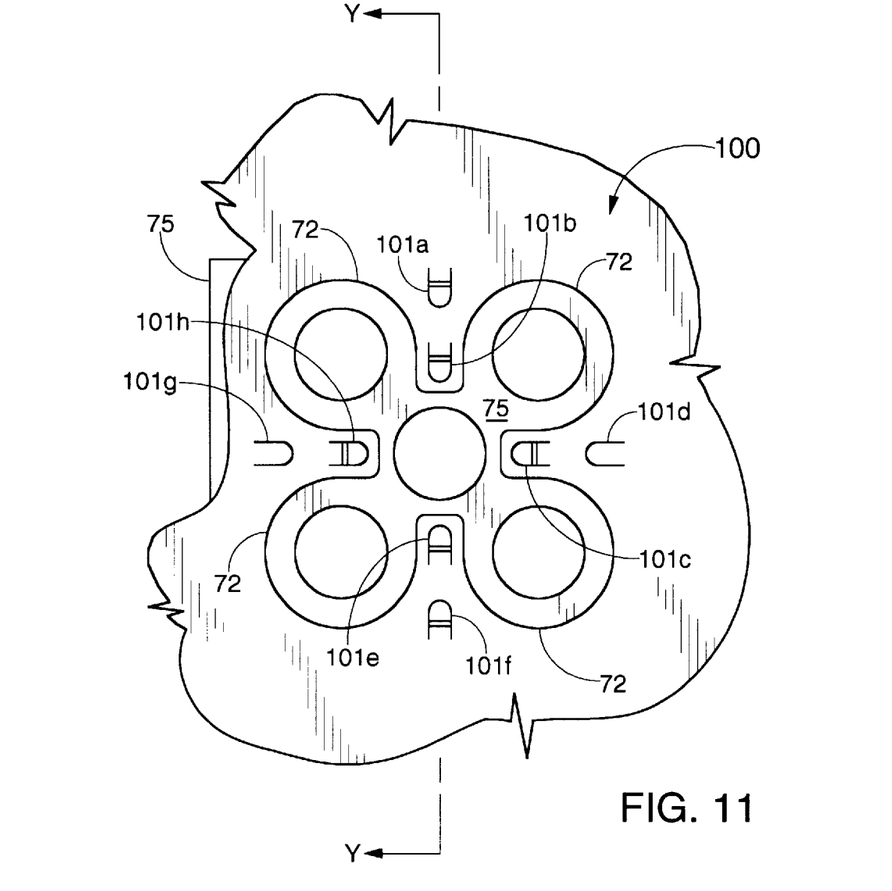
FIG. 11 shows an alternative bracket to junction box assembly.
Figure 12:
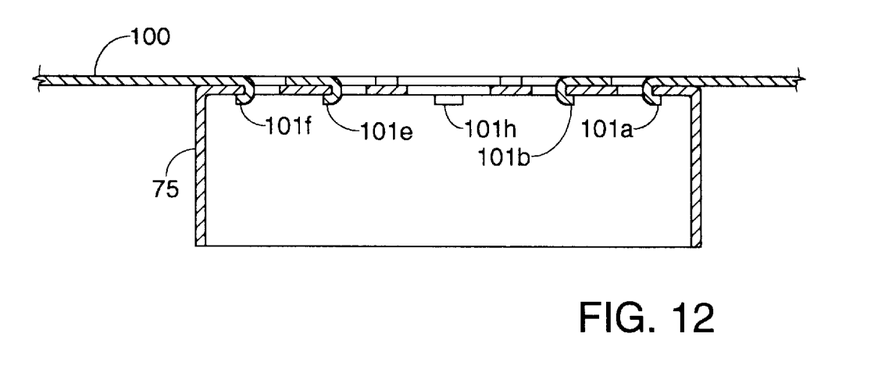
FIG. 12 shows a cross-section view at plane Y—Y of FIG. 11.

FIGS. 11 & 12, otherwise identical to FIGS. 9 & 10, shows an alternative embodiment bracket 100 wherein tabs 101a–h are located to match the hole pattern of junction box 75, regardless of the relative orthagonal orientation of the two parts. As best seen in FIG. 12, a section view taken along Y—Y of FIG. 11 as many as six of the tabs 101a–h are bent through matching holes (ref. FIG. 6) with a punch and clinched, attaching bracket 100 firmly to junction box 75. The assembly may proceed from this point in a manner identical with that of FIGS. 9 & 10.

It is to be understood that the present invention is not limited to the disclosed embodiments and may also be expressed by modification or substitution of elements, without deviating from the spirit of the invention.

I claim:

1. A bracket for supporting conduit entering an electrical junction box wherein the junction box has sides with conduit entry ports and a back including a predetermined hole pattern, the bracket comprising;

a flat plate having a central portion and a circumferential, outwardly extending portion;

means for attachment of said central portion to the back of said junction box so that said outwardly extended portion extends beyond the sides thereof; and a conduit clamp, including means for clamping to said outwardly extending portion so as to place said conduit clamp in substantial alignment with one of said conduit entry ports in at least one of said junction box sides.

2. A bracket according to claim 1 wherein said central portion attachment means comprises tabs arranged in a pattern conforming to the predetermined hole pattern of said junction box back.

3. A bracket according to claim 1 wherein said central portion attachment means comprises drawn tubular extensions arranged in a pattern conforming to the predetermined hole pattern of said junction box back.

4. A bracket according to claim 1 wherein said outwardly extended portion includes a circumferential stiffening flange.

5. A bracket according to claim 4 wherein said means for clamping to said outwardly extending portion engages said circumferential stiffening flange.

6. A bracket for supporting conduit entering an electrical junction box wherein the junction box has sides with conduit entry ports and a back including a predetermined hole pattern, the bracket comprising;

a flat plate having a central portion and an outwardly extended portion with a circumferential outer edge;

means for attachment of said central portion to the back of said junction box so that said circumferential outer edge extends beyond the sides thereof;

a conduit clamp; and a clip attaching said conduit clamp to said circumferential outer edge so as to place said conduit clamp in substantial alignment with one of said conduit entry ports in at least one of said junction box sides.

7. A bracket according to claim 6 wherein said central portion attachment means comprises tabs arranged in a pattern conforming to predetermined hole pattern of said junction box back.

8. A bracket according to claim 6 wherein said central portion attachment means comprises drawn tubular extensions arranged in a pattern conforming to the predetermined hole pattern of said junction box back.

9. A bracket according to claim 6 wherein said circumferential outer edge includes a circumferential stiffening flange.

10. A bracket according to claim 9 wherein said attaching clip engages said circumferential stiffening flange.

11. A method for supporting an electrical conduit entering a junction box comprising the steps of:

providing an electrical junction box including a back with mounting holes and sides with conduit entry ports;

providing a flat plate for attaching to the junction box, said flat plate including a central portion and a circumferential, outwardly extending portion;

attaching the junction box centrally on said flat plate so that the outwardly extending flat plate portion extends beyond the sides of the box;

placing conduit clamping attachments on a conduit; and clamping said conduit clamping attachments to the outwardly extending portion of said flat plate so as to align the conduit for entry into said conduit entry ports in the sides of said box.

\* \* \* \* \*

UNITED STATES PATENT AND TRADEMARK OFFICE
CERTIFICATE OF CORRECTION

PATENT NO. : 5,883,332
DATED : March 16, 1999
INVENTOR(S) : Bobby Collard

It is certified that error appears in the above-identified patent and that said Letters Patent is hereby corrected as shown below:

On the title page, item [76]:

Inventor's name and address:

Bobby Collard
405 Brookview Dr.
Garland, Tex  75043

Column 4, line 65, delete "nots" and insert "nuts".

Signed and Sealed this

Twenty-seventh Day of July, 1999

Attest:

Q. TODD DICKINSON

*Attesting Officer*    Acting Commissioner of Patents and Trademarks